United States Patent [19]

Wallace et al.

[11] 4,156,311

[45] May 29, 1979

[54] SHEAR WITH RESILIENT LATCH

[75] Inventors: Edward M. Wallace, Longmeadow; Robert G. Gosselin, Springfield, both of Mass.

[73] Assignee: Wallace Mfg. Corp., Enfield, Conn.

[21] Appl. No.: 864,790

[22] Filed: Dec. 27, 1977

Related U.S. Application Data

[63] Continuation-in-part of Ser. No. 718,827, Aug. 30, 1976, Pat. No. 4,073,059.

[51] Int. Cl.² .............................................. B26B 13/16
[52] U.S. Cl. ....................................................... 30/262
[58] Field of Search ........................... 30/261, 262, 271; 81/417

[56] References Cited

U.S. PATENT DOCUMENTS

| | | | |
|---|---|---|---|
| 2,310,959 | 2/1943 | James | 30/262 X |
| 2,563,590 | 8/1951 | Dolansky | 30/262 |
| 2,734,268 | 2/1956 | Grinling | 30/262 X |
| 3,416,226 | 12/1968 | Pfaffenbach | 30/261 |
| 3,869,793 | 3/1975 | Ferguson | 30/262 |

FOREIGN PATENT DOCUMENTS 1443401  7/1976  United Kingdom ..................... 81/417

Primary Examiner—Jimmy C. Peters
Attorney, Agent, or Firm—Ross, Ross & Flavin

[57] ABSTRACT

A shear having pivoted crossed blades normally biased to opened position is provided with a modular type latch allowing the single handed locking of the handles in a locked position or releasing of the locked handles into an opened position. The latch is integrated as a functional unit for ready association with the other previously assembled shear components by the mere insertion of the unit in situ whereat the shear is immediately available for operational use, securement being obtained without the need for screws or springs or hooks or like supplementary securement means, the latch being self retaining, once inserted. The salient feature is that the latch, which in one key sense is not fixedly related, is an independent unit which is a part of the total structure and serves as the means for latching and unlatching the blades in desired relationships.

6 Claims, 4 Drawing Figures

SHEAR WITH RESILIENT LATCH

This is a continuation-in-part of our co-pending application Ser. No. 718,827, filed Aug. 30, 1976 now U.S. Pat. No. 4,073,059 issued Feb. 14, 1978.

The shears envisioned for the exploitation of the principles of this invention are shears such as of the pass-by or anvil types, in either of which types the blades are normally biased to opened position so that the blades desirably are protected against damage, and users desirably are protected against injury. It thus occurred that it would be practical for a locking mechanism to be readily insertible into the construction to maintain the blades in blade-closed position where they are least susceptible to damage and least likely to cause injury to persons, when not in use, and wherein the locking mechanism desirably functions against the action of the usual biasing means which tends to urge the members to blades-opened position.

The latch or immobilizing mechanism contemplated is for use in any type of shear construction where the crossed blades are pivoted and it is desired to hold the handles or the blades, or both, in a locked-non-operative position, when not in use.

The principal object of the invention is directed to the provision of a simple, inexpensive, easily-operated latch for a shear which is modular in form in the salient respect that it may be readily and freely inserted into a provided opening in the shear and at once, without any additional securement as by pins or screws or levers or the like, is ready for operational use. The key to its newness and novelty lies in the distinguishing fact that it is instantaneously operative upon insertion and, further, is non-retractable, once inserted, without an extraordinary or unusual prying effort.

The latch is a many-sided, completely-preformed, magazine-type, independent, structure which can be freely associated with an otherwise-fully-assembled shear with the greatest of ease. The mere insertion of the former into a provided opening in the latter being all that is necessary, and with only a slight manual pressure exerted by the assembler's or operator's hand being all that is dictated.

The structure is defined as comprising an inboard locking part and an outboard operating part, with the locking part being freely feedable by insertion through a latch-receiving slot in a side wall of one of the cheeks of a shear handle and into an occupiable space therebeyond and with the latch being frictionally held by and slidable relative to the walls of the latch-receiving slot, and further with the base of the operating part at its interface with the cheek surface, being slidable relative thereto.

It is known in the art to utilize a loop or bight mounted on one handle to be swung over the other handle.

It is likewise known to employ a collar, bight or loop element embracing both handles or both blades to firmly engage the handles or the blades.

Equally well known are internal and external screw elements which may be manipulated into abutting relationship with a blade or handle.

Sometimes found in prior art devices are toothed and indented members which interengage to prevent relative blade movement. Likewise known are cogs or projections connected to one handle or blade mating with indentations or notches strategically associated with the other handle or blade.

Equally well known in shear construction is the spring-operated mechanism, with the attendant difficulty that an appropriate spring tension is mandatory for successful shear operation.

Known too has been the use of the common pivot pin to assume the desired locking and unlocking function.

But all of these prior art systems suffer the disadvantage that they must be physically secured in some way to a blade or handle. Too they can become accidentally disengaged and can present unattractive appearances.

The latch disclosed herein is a unitary member which requires no supplemental part or attaching medium such as a screw, spring, pin, reivet or the like. The member itself may be readily and freely inserted into a provided opening in the shear so that an inboard portion is disposed on one side of the opening and interiorly of the shear and an outboard portion is disposed on the other side of the opening and exteriorly of the shear, all in a manner such that additional securement means is not required and the latch is rendered immediately available for operational use.

The inboard portion is disposed interiorly of the shear so as to be concealed from view while offering the locking function and the outboard portion is disposed exteriorly of the shear so as to allow the operating function, same being conveniently and readily manipulated by the thumb of the very hand holding the shear.

When the latch is moved to unlocked position, it is desirable that it reliably remain thereat so that the shear can be operatively manipulated in as facile a manner as possible. If the latch were to move unintentionally from unlocked to locked position, while the shear is in use, it would obviously interfere with the desired operation. Too, it must be so located that it can be readily manipulated at all times, even when only one hand of the operator is available as when holding onto a ladder or grasping the material being cut, and even while the operator is holding the shear with his other hand. Such a provision allows the greatest degree of protection to both the shear and its user, since the shear is likely to be brought in its locked position to the situs where it is to be employed, then unlocked, manipulated, and then, returned to locked position before moving on.

The parts involved are as simple and sturdy as possible, from the views both of minimizing costs and of maximizing sturdiness and reliability. The fewer the parts in a given construction, the easier its manufacture and assemblage and the less likely it is to sustain breakage or damage. To these ends, this invention is directed.

Figure 1:
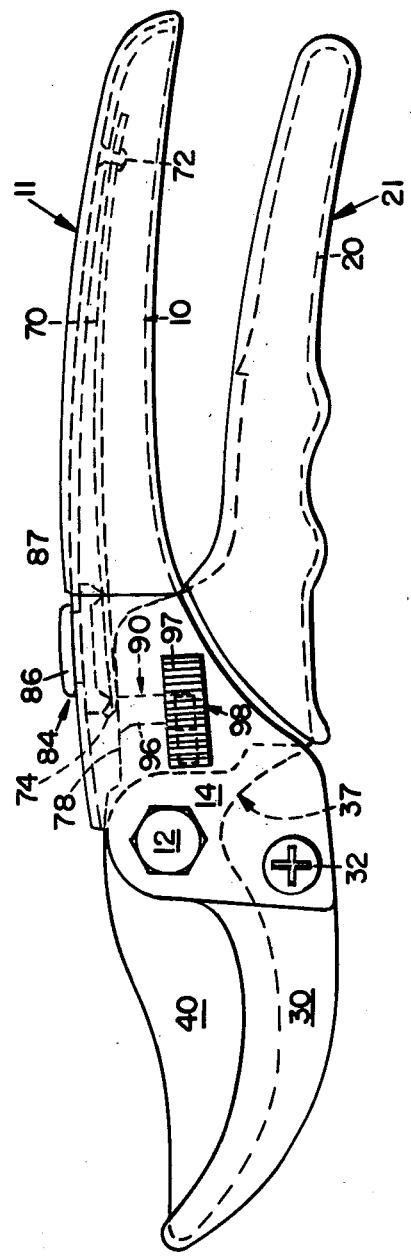
FIG. 1 is a view, in side elevation, of a shear incorporating the invention.
Figure 4:
FIG. 4 is an enlarged view in side elevation of the latch.
Figure 2:
FIG. 2 is a fragmentary view, in side elevation, of the central top portion of the cutting blade.
Figure 3:
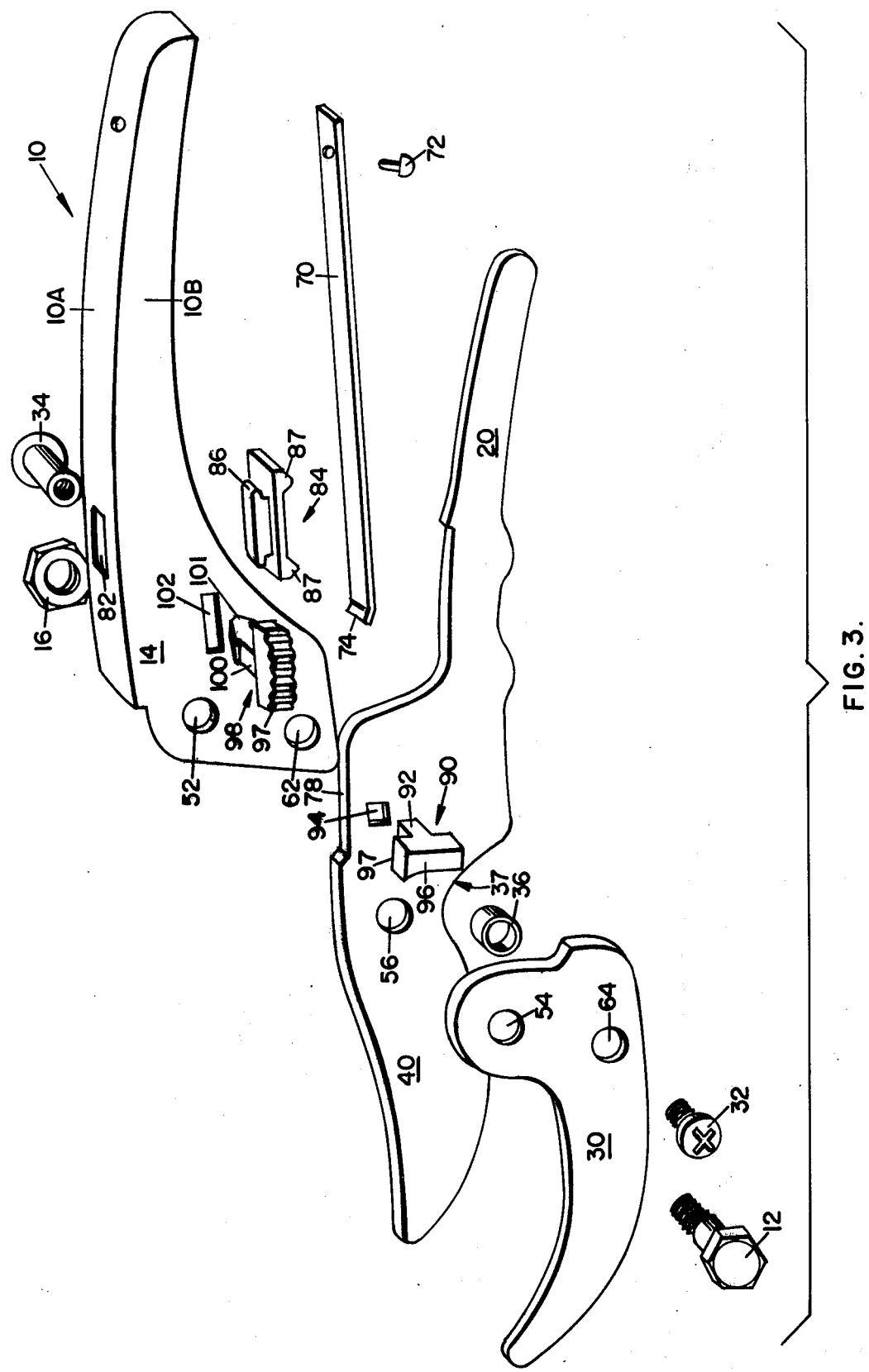
FIG. 3 is an exploded isometric view of the components of the FIG. 1 shear.

While many types of shear are contemplated for the employement therewith of this invention, there is illustrated a crossed lever type of tool in the form of a pass-by shear and same is shown for purposes of exemplification only. It includes a pair of handles, an upper handle 10 and a lower handle 20, pivotally joined by a pivot bolt 12, the handles being covered by the usual rubber or plastic covering members 11 and 21 respectively.

Upper handle 10 is configured to define a top wall 10A and opposite side walls 10B and at its inboard end is provided with a yoke 14 between the spaced opposite cheeks of which lower handle 20 is extendable. The yoke cheeks are also disposed on opposite sides of a lower hook or anvil blade 30 and an adjacent confronting upper cutting blade 40 in the usual manner.

Upper cutting blade 40 and lower handle 20 are preferentially unitary.

Lower hook or anvil blade 30 is in pivotal relationship with upper cutting blade 40 as by pivot bolt 12 which is extendable transversely through the opposite cheeks of yoke 14 and through lower hook or anvil blade 30 and upper cutting blade 40, the pivot bolt being secured by a pivot nut 16 threaded thereon in known manner.

Pivot bolt 12, extended through the suitably-aligned apertures 52 in yoke 14, aperture 54 in the lower hook or anvil blade, and aperture 56 in the upper cutting cutting blade 40, defines a fulcrum on which various components rotate.

A lower blade screw 32 is extendable through suitably-aligned aperture 62 of one cheek of yoke 14 and aperture 64 of lower hook or anvil blade.

A bushing 34 is extendable through an aligned aperture (not shown) in the other cheek of yoke 14 and a spacing collar and stop 36 is sleeved on the bushing between the lower blade and yoke cheek distantly thereof to allow a space for the vertical movement of upper blade 40 relative to lower blade 30 and to serve as a stop for the shear-opened position, the curvilinear lower face 37 of handle 20 coming to bear on the spacing collar and stop.

Relative pivotal movement, between upper blade 40 and unitary lower handle 20 on the one hand, and lower blade 30 and upper handle 10 fixedly secured thereto on the other hand, is allowed by pivot bolt 12, so that the blades are actuated by handle manipulation.

A spring-actuated biasing means, preset so as to bias the cutting members to opened position, is in the form of a leaf spring 70 concealed within the upper handle and secured at its outer extremity to the inside wall of the upper handle by a leaf spring rivet 72 and configured at its inboard extremity with an upturned terminal portion 74 for bearing downwardly upon and riding along a flat 78 on the upper spine of upper blade 40.

As lower handle 20 is brought upwardly relative to upper handle 10 by the pressure of the operator's hand, terminal portion 74 is caused to ride along flat 78.

A resilient bumper 84 is suitable related to the inside walls of the upper handle as to be held securely relative thereto either by some suitable adhesive between the components or by some arrangement of detents or lances by which the bumper may be held relative to the upper handle without adversely affecting its compressive damping function.

One system for interrelating such components, although by no means the only system, comprehends upper wall 10A of upper handle 10 being suitably slotted as at 82 for nesting therewithin an upper neck 86 of bumper 84, same being held secure relative to the upper handle by the tight fit of neck 86 in the slot. The major portion of the bumper will extend downwardly below upper wall 10A with bearing projections 87 extending downwardly adjacent each end thereof, each being embraceable with the upper face of leaf spring 70 and one thereof being engageable with terminal portion 74 of the leaf spring, all to the end that the bumper is locked securely in situ.

By locating the bumper forwardly relative to the free end of the spring, the spring accommodates to the lower confronting projections of the bumper to aid in locking the bumper in situ and to locate it more positively relative to the upper blade spine.

A lock stud 90 comprised of a generally rectangular member 96, of any suitable rugged plastic or metal, has a transversely-extending nose 92 projecting outwardly of one side thereof, the nose being nestably receivable for a tight fit with a suitable lock stud opening 94 extending transversely through the cutting blade so that the lock stud 90 embraces the face of cutting blade 40 and is of such dimension as to offer an upper extremity 97 aligned with flat 78 of the cutting blade thereby providing an additional support for the free end of spring 70.

A latch 98 comprises a many-sided, completely-preformed, magazine-type, independent, structure whih can be subsequently associated with an otherwise-fully-assembled shear, the structure being defined as comprising an inboard locking part 100 and an outboard driving part 97, with the locking part being freely feedable by insertion through a latch-receiving slot 102 in one of the cheeks of the yoke and into an occupiable space therebeyond with the latch being frictionally held by and slideable relative to the walls of the latch-receiving slot and with the base 98 of the driving part at its interface with the cheek surface being slideable relative thereto.

That is, the latch is slideable relative to the cheek in surface-to-surface contact, the surfaces approaching each other as the latch is dropped into the latch-receiving slot.

Inboard locking part 100 comprises a neck and a nose 101 at its inner free end which nose defines a pair of detents 103 which bear against the inside wall of the cheek of the yoke on opposite sides of the latch receiving slot.

Outboard driving part 97 has an outermost knurled surface so as to provide a manually-engageable operator from which extends centrally thereof the neck 100 which is extendable through the lock slot 102 in one cheek of the yoke so that the lock mechanism may be slidable in fore and aft directions as determined by the length of the slot.

The locked rearward position is achieved by the passage of nose 101 beneath the lower or bottom edge of the blade lock stud 90 so as to preclude downward movement of the lower handle under the biasing force of the leaf spring and with an unlocked forward position being achieved by the passage of nose 101 forwardly and clear of blade lock stud 90, this to allow downward movement of the lower handle under the biasing force of the leaf spring.

With nose 101 and blade lock stud 90 thus interengaged, the locking function is operational. When disengaged, the unlocking function is operational.

When the latch is moved to unlocking position, it reliably remains in that position, so that the shear can be operatively manipulated in a facile manner.

Conversely, when the latch is moved to locking position, it reliably remains in that position, so that the shear will not accidently open.

The latch is located where it can be readily manipulated even when only one hand of the operator is available as when holding onto a ladder or grasping the material being cut, and even while the operator is grasping the shear. Such a location provides the greatest degree of protection both to the shear and to the user thereof, since the shear may be moved in locked position to the place where it is to be used, then unlocked, manipulated in operative fashion, and then, immediately and without difficulty, locked in closed position, even though the user may have had but one hand available throughout.

The latch is of a resilient material and serves as a friction device, there being almost a press fit between latch and slot.

There are two ways in which to obtain the benefit of the friction; first, by making the restricted neck of the inboard locking part wider than the latch-receiving slot so as to allow an obvious press fit, and second, by maintaining a length of the neck at something less than the thickness of the stamping at the cheek, again so as to allow an obvious press fit.

The real key to the invention lies in the fact that the latch is integrated as a unit for ready association with the other assembled shear components by the mere insertion of the unit in situ for operational use, securement to the shear being obtained without the use of screws or springs or like securement means all to the end that it is not only easy to assemble but also that no additional parts are required for its operation.

We claim:

1. A shear comprising:
   a cutting blade,
   a holding blade,
   a yoke shaped upper handle straddling the blades,
   a lower handle unitary with the cutting blade,
   interengaging means between handles and blades, and
   a locking mechanism consisting of a yieldable slidable latch insertable in a latch-receiving slot in a cheek of the yoke of the upper handle for permanent integration with the upper handle, and a cooperant lock element, with the latch being slidable between a cutting blade-holding blade locked position of interengagement with the lock element and a cutting blade-holding blade unlocked position of disengagement with the lock element.

2. In the shear of claim 1, the latch being yieldable and including an inboard locking part and an outboard operating part, with the inboard locking part being receivable in the space inboard of the latch-receiving slot and held relative to the walls of the latch-receiving slot by frictional engagement therewith.

3. In the shear of claim 2, with the outboard operating part having a surface-to-surface engagement with the cheek of the yoke for sliding movement relative thereto.

4. A latch for a shear comprising a cutting blade and a holding blade and a yoke shaped upper handle straddling the blades and a lower handle unitary with the cutting blade, interengaging means between handles and blades comprising: a fully-preformed yieldable magazine-type unitary structure including an inboard locking part and an outboard operating part, the locking part being freely feedable by simple insertion through a latch-receiving slot in one of the side walls of the yoke of the upper handle and being frictionally held relative to the walls of the slot for permanent integration with the handle and being slideable relative to the upper handle between blades locked and closed and blades unlocked and opened positions.

5. A latch for a shear comprising a cutting blade and a holding blade and a yoke shaped upper handle straddling the blades and a lower handle unitary with the cutting blade, interengaging means between handles and blades comprising: a fully-preformed yieldable magazine-type unitary structure including an inboard locking part and an outboard operating part, the locking part being freely feedable by simple insertion through a latch-receiving slot in one of the side walls of the yoke of the upper handle and being frictionally held relative to the walls of the slot for permanent integration with the handle and being slideable relative to the upper handle between blades locked and closed and blades unlocked and opened positions.

6. A resilient latch for a shear comprising:
   a pair of pivoted crossed levers having cooperatively engaging blade portions and handle portions, said latch consisting of an inboard locking part and an outboard operating part, the inboard locking part having an interference fit in a latch-receiving slot located in one of the handles close to the pivotal area, the outboard operating part being movable relative to the slot to allow the other handle to be in position open or position closed as desired.

* * * * *